Nov. 14, 1967 F. G. HEUMANN 3,352,095

TWISTER APPARATUS AND DRIVING MEANS THEREFOR

Filed Aug. 13, 1964 2 Sheets-Sheet 2

INVENTOR.
FREDERICK G. HEUMANN
BY
ATTORNEYS

United States Patent Office 3,352,095
Patented Nov. 14, 1967

3,352,095
TWISTER APPARATUS AND DRIVING
MEANS THEREFOR
Frederick G. Heumann, Anderson, S.C., assignor to
Owens-Corning Fiberglas Corporation, a corporation
of Delaware
Filed Aug. 13, 1964, Ser. No. 389,251
5 Claims. (Cl. 57—105)

This invention relates generally to a method of fabrication of and means for driving frictionally engageable apparatus and more particularly to a method of fabricating endless and seamless belts for, and means for driving filamentary material collectors or bobbins employed in processing, collecting or packaging textile strands or yarns.

It is conventional practice in textile machines such as twister machines for twisting or plying yarns or strands wherein the bobbins or collectors are mounted on spindles driven at high speeds by driving belts to have a large number of spindles mounted in a bolster rail and driven from a common drive arrangement by an endless belt. Endless belts for this and other similar applications have consisted of layers of cut fabric reinforcement laminated with rubber or similar material spliced to be endless. The cut fabric or core has been nylon, polyester, canvas, etc. In order to obtain the proper tensile strength in the longitudinal direction as well as to prevent the belts from stretching, a considerable thickness made of a multiplicity of layers of bonding cement and fabrics have been required. It is obvious that the heavier the belt is, the more horsepower is required to drive the belt. Therefore, the horsepower requirements of apparatus such as a twister machine have been high.

In the particular application illustrated herein the tracking of the belts is also extremely important, since yarn or filamentary material is being taken from supply packages positioned on mandrels and twisted or plied or otherwise processed onto collector bobbins. If the belt that is rotating or driving the collector bobbin is too heavy it does not track properly, then the twisting or other processing may be interrupted either by the entanglements caused or by the jarring of the collecting spindle and the snapping of the filament or yarn being processed. It is also obvious that the lump in the belt resulting from the splicing to make the belt endless will vibrate the individual collectors or spindles as it makes its trip around the endless loop, thus interfering with the processing of the filament or yarn. Further, the splicing lump also interferes with the proper tracking of the belt. Previous endless belts have also been made heavier since their thickness and thus weight have also been increased by the requirement to reduce stretching of the belt as much as possible. Even with the added thickness the previous endless belts have been guided over a compensating pulley having an axial adjustment to take up slack as the belt stretches. This usually requires constant attention by the operator since if the slack is not removed the belt will not track properly.

It is, accordingly, an object of this invention to provide an improved method of fabricating endless and seamless belts and to provide improved apparatus for twisting or otherwise processing filamentary yarn by incorporating in such apparatus an endless and seamless belt as described hereinafter.

It is another object of this invention to provide an improved endless belt having a reduced weight to tensile strength ratio as compared to previous endless belts, and further having a seamless feature enabling the belt of this invention to track better and to reduce vibration.

This invention features endless and seamless belt means comprising a plurality of wraps of a longitudinally extending lineal textile body of glass fiber set in a coating composition. The lineal textile body of glass fiber may be a strand or yarn or other filamentary material of glass fiber in which the high tensile strength may be properly utilized. In one form the lineal textile body may have a previously applied flexible resinous coating selected from a group including polyester, epoxy, and plastisol coatings while the coating composition binding the wraps of the lineal textile body together is advantageously a flexible resin. In another form the lineal textile body may have a previously applied elastomeric coating such as neoprene or other rubber type coating and the coating composition that is later applied after the plurality of wraps are positioned is advantageously also an elastomeric of the same class. With the elastomeric and flexible resinous coatings that are previously applied an advantage is gained in that the plurality of wraps of the lineal textile body may be more easily bound into an endless and seamless belt by the coating composition.

This invention also features a method for fabricating a glass-reinforced, endless and seamless belt which comprises the steps of winding a plurality of preferably substantially parallel wraps of a lineal textile body of glass fiber around a support means and applying a coating composition to the plurality of wraps. The winding step may comprise rotating a mandrel having a circumference equal to the length of the belt desired and guiding the lineal textile body onto the mandrel. Alternatively, the winding step may comprise guiding the lineal textile body around a plurality of support means which are either stationary or rotatable. If rotatable support means are utilized then a further step in the method may include rotating the support means to move the plurality of wraps past at least one station for applying the coating composition.

The invention further features apparatus for driving a strand or yarn collector or the like which comprises means for supporting the collector for rotation and an endless and seamless belt means mounted for driving engagement with the rotatable support means. The belt means includes the plurality of wraps of longitudinally extending lineal textile body of glass fiber set in a coating composition as described hereinbefore.

Other objects, advantages and features of this invention will become apparent when the following description is taken in conjunction with the accompanying drawings in which.

Figure 1:
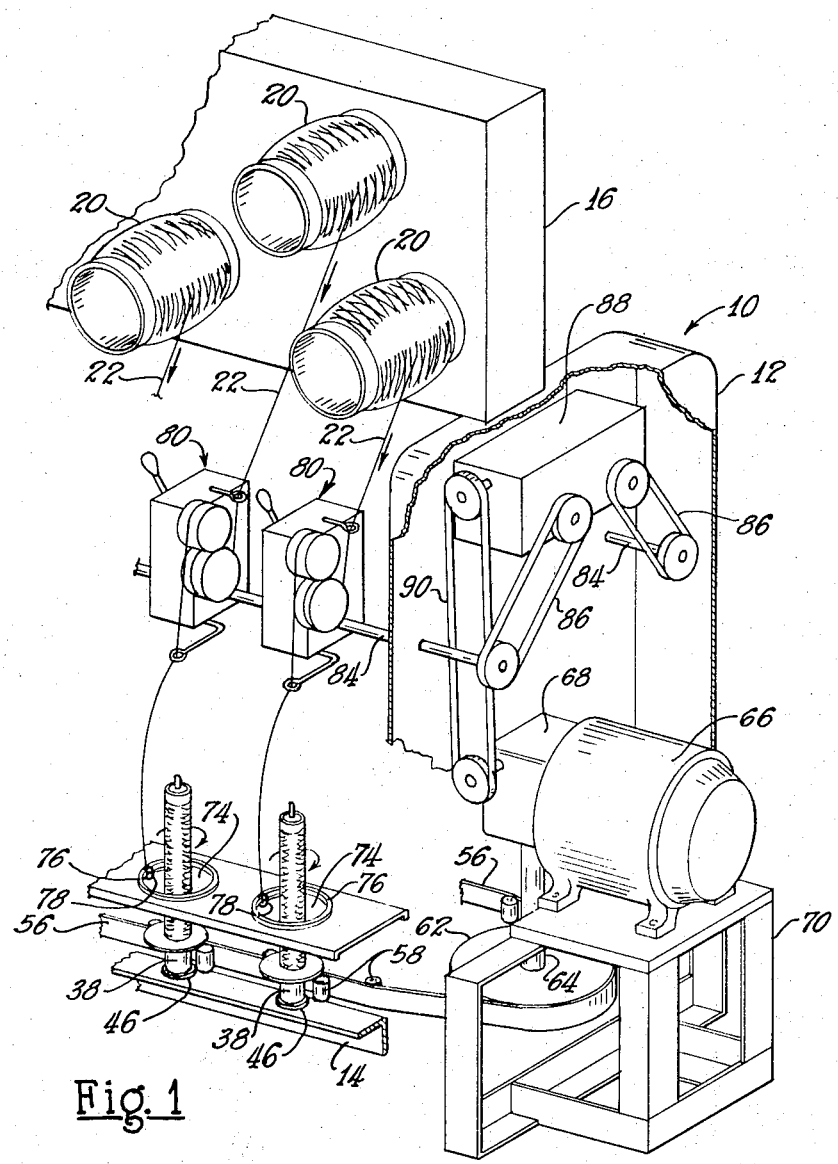
FIG. 1 is an isometric view of a portion of a textile strand or yarn twisting or processing apparatus illustrating the invention.

Referring to the drawings in detail and initially to FIG. 1, there is illustrated a conventional type of twister or twister apparatus 10 for processing filamentary materials. The apparatus 10 is inclusive of a frame structure comprising spaced housings 12, one at each end of the apparatus, one of which is illustrated in FIG. 1, the end housings being connected by bolster rails 14 one of which is shown in FIG. 1, and by a supply package mounting structure 16 and other frame members (not shown). Structure 16 is equipped with a plurality of mandrels or supports (not shown), each mandrel arranged to support a supply package 20 of textile strands, yarn or filamentary material 22 to be twisted or processed through the use of the apparatus.

Figure 2:
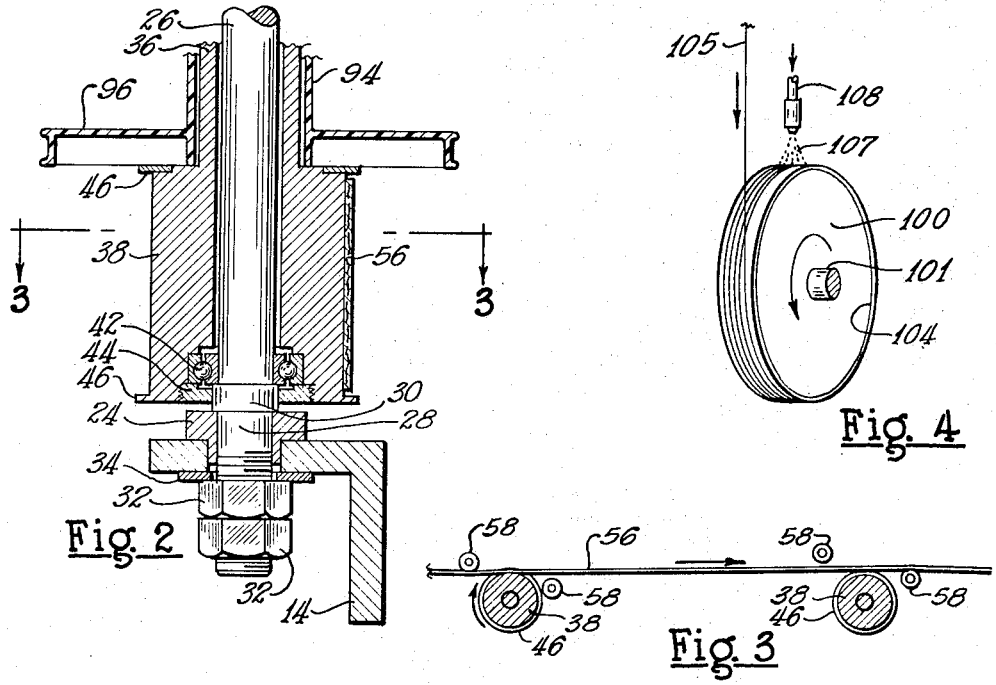
FIG. 2 is a vertical sectional view illustrating a portion of a form of spindle mounting and bobbin drive arrangement of the invention.

A bolster rail 14 is arranged at each side of the machine, one being shown in FIG. 1, each bolster rail supporting a plurality of bushing members or spindle mounting units 24, particularly shown in FIG. 2. Each spindle mounting unit comprises a relatively stationary shaft or blade 26 having a tenon portion 28 extending through the bushing or member 24, a shoulder 30 on the blade engaging the upper surface of the bushing or blade mounting member 24.

The lower end of the tenon 28 is threaded to accommodate securing nuts 32, a washer 34 being disposed between one of the nuts 32 and the bolster rail 14. The blade 26 receives a hollow or tubular spindle 36 fashioned at its lower end with a whorl 38 arranged to be engaged by a driving belt or tape 56 for rotating the spindle 36. The lower portion of the whorl 38 is fashioned with an axial recess accommodating an anti-friction bearing or ball bearing construction 42 retained in assembled relation in the whorl 38 by a threaded ring or retainer 44.

The whorl 38 is provided with flanges 46 to maintain cooperative relation of the whorl with the driving belt. The upper end of the spindle 36 is similarly provided with a recess accommodating a bearing not shown. The spindles 36 are disposed to be driven simultaneously by a single drive belt or tape 56 adapted for engagement with the whorls 38. Idler rollers 58 are disposed adjacent the driving belt 56 and the whorls 38 and are relatively movable by conventional means (not shown) for moving the drive belt toward or away from an individual spindle to selectively establish or interrupt a drive to each spindle.

The belt 56 extends lengthwise of the apparatus and is engaged by a drive pulley 62 mounted upon a shaft 64 driven by an electrically energizable motor 66 through power transmission mechanism or gearing of conventional construction contained within a housing 68. The motor 66 is mounted on a supplemental frame 70 adjacent one end of the twister apparatus.

The twister apparatus includes conventional ring rails, one at each side, arranged to be reciprocated in a vertical direction by a conventional means (not shown) driven by the motor 66.

The ring rail is provided with circular openings 74 to accommodate the spindles and bobbins, each circular opening being defined by a circular track 76 mounting a traveler or flyer 78 which is freely rotatable around the spindle and bobbin and through which the strand or yarn 22 is threaded in the conventional manner. The twister apparatus includes a feed roll unit 80 of conventional character individual to each strand or yarn for feeding the same from the package 20 at a speed at which the strand or yarn is to be wound upon a bobbin. The strand or yarn feeding or advancing mechanism of each of the units 80 is driven from a shaft 84 rotated by a belt 86 from power transmission mechanism of conventional character enclosed in the housing 88 driven by mechanism in the housing 68 through pulleys and a belt 90.

Each of the units 80 is constructed and arranged to interrupt the feed of the strand in the event of breakage. With the use of the present invention the breakage and therefore the interruption of feed of the strand is cut down. Each of the spindles 36 is arranged to mount or support a bobbin or collector 94 upon which the strand or yarn is wound.

The lower end of the bobbin 94 may be fashioned with a circular flange 96 forming an abutment for filamentary material wound upon the bobbin.

The invention embraces an improved means for driving collectors, bobbins or the like by an endless and seamless belt of this invention and further embraces methods and means for fabricating the endless and seamless belts utilized in this invention.

The extremely high tensile strength of glass fibers are well known. This invention makes use of said high tensile strength by providing a method and means for fabricating an endless and seamless belt for applications in which weight of the belt and belt splices tend to make the entire operation much less successful and efficient.

Figure 4:
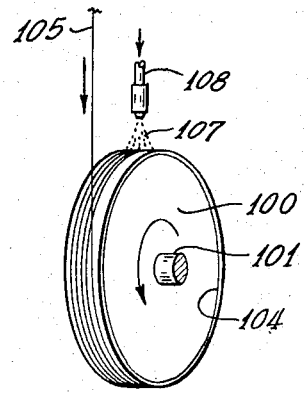
FIG. 4 illustrates a method of fabricating the belt means of this invention.
Figure 3:
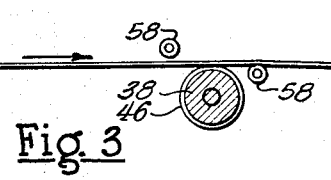
FIG. 3 is a sectional plan view of a portion of the apparatus of FIG. 1 illustrating the method of engaging the driving means with the spindle rotating means.

FIGURE 4 illustrates a mandrel 100 mounted for rotation by shaft 101 by a power means not shown. The mandrel means may support an inner preformed ply 104 to provide a base for the coating composition which is to bind the parallel wraps together. A lineal textile body of glass fiber 105 is guided as the mandrel 100 is rotated such that a plurality of longitudinally extending wraps of the textile body of glass fiber are wound upon the mandrel 100. A coating composition 107 may be applied by spray nozzle means 108 either as the textile body 105 is being wound on the mandrel 100 or after a predetermined number of wraps have been wound onto the mandrel 100. The spray nozzle means 108 is meant only to typify several suitable means of applying the coating composition. For example, a felt wiper which is supplied by a pressurized source of coating material may be utilized to apply the coating composition 107. If the coating composition 107 is being applied as the textile body 105 is being wound upon the mandrel 100 or after a first row of wraps has been wound upon the mandrel 100 it may be possible to omit the inner or backing ply 104 from the fabrication process. The omission of the inner ply 104 may be particularly advantageous when the lineal textile body 105 has previously been coated with an elastomer such as neoprene or other rubber type material, or with a flexible resinous material such as polyester, epoxy, or plastisol. If the coating material previously applied to the body 105 is an elastomer, a similar elastomer should be used for the coating composition 107. If the previously applied coating to the lineal textile body 105 is a flexible resin, then a flexible resinous coating composition should be used for the coating composition 107. In the illustration of FIG. 4 the circumference of the mandrel 100 is equal to the desired length of the endless and seamless belt being fabricated. There are several known means by which the initial end of the lineal textile body 105 may be secured in place on the inner ply 104 or on the surface of the mandrel 100 when the fabrication process is started. For the purposes of this invention, however, it will suffice to say that any adhesive that will hold the end of the lineal textile body 105 in place during the winding process is quite suitable and may also be utilized for fastening the terminal end of the lineal textile body 105. If the coating composition 107 is being applied during the winding process the adhesives for the initial and terminal ends may not be required.

Figure 5:
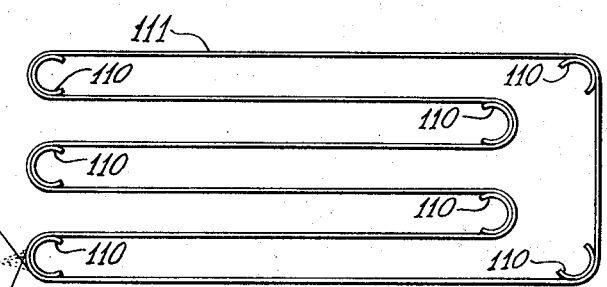
FIG. 5 illustrates a further method of fabricating an endless and seamless belt of this invention.

Referring to FIG. 5 there is shown another method for fabricating an endless and seamless glass reinforced belt of this invention whenever the length of the belt desired exceeds a size that is practical to fabricate on a mandrel 100 of FIG. 4. In FIG. 5 a plurality of rounded upright support stakes 110 are positioned at a spaced distance and in a sufficient number of rows to attain the length desired. As will be noted, the stakes 110 are of sufficient size and are properly contoured to avoid having to bend the glass fiber around sharp corners since this would place an undue shear stress on the glass fiber yarn and further might result in humped portions in the belt when the coating application is applied. As in FIG. 4 an inner ply may be utilized if desired. The lineal textile body 105 is guided around the stakes 110 to obtain a plurality of wraps. The initial and terminal ends of the textile body 111 may be secured by an adhesive as described hereinbefore. A coating composition as discussed in the apparatus for FIG. 4 may then be applied to provide the final form of the endless and seamless belt.

Figure 6:
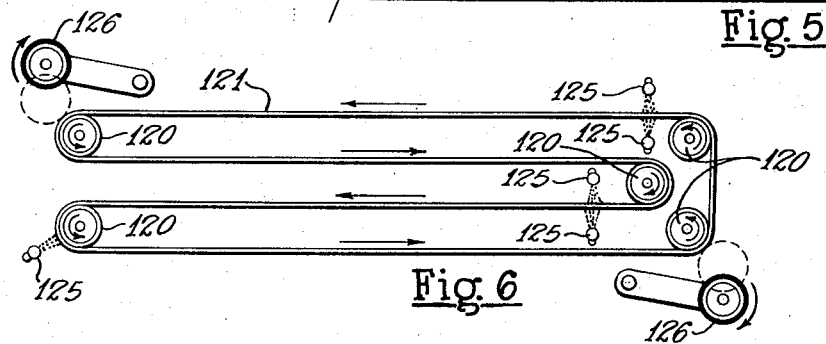
FIG. 6 illustrates still another method of fabricating an endless and seamless belt for use in this invention.

Referring to FIG. 6 there is shown a method for fabricating the belt of this invention in which rollers 120 have been utilized in a manner similar to the upright support stakes 110 of FIG. 5. A lineal textile body 121 is again guided around the support rollers 120 to obtain a plurality of wraps. An inner or backing ply may again be utilized if desired. After a plurality of wraps have been placed upon the support network the coating composition may be applied via suitable means such as spray nozzles 125. Spray nozzles 125 may be movable or stationary. If stationary, driving rollers 126 may be shifted into position against the partially fabricated endless and seamless belt and may be utilized to drive the belt around the idler rollers 120 past the coating composition stations 125. The initial and terminal ends of the lineal textile body 121 may be fixed in place by adhesive or by the coating composition.

There has thus been described a method for fabricating an improved endless and seamless belt which may be combined with twister apparatus to provide the following advantages. The belt of this invention is substantially unstretchable and therefore the twister apparatus does not require constant belt length compensation. The thickness and weight of the belt is sharply reduced. This feature may be utilized to reduce the horsepower required to drive the belt (experiment has shown a 50% reduction in horsepower requirements), or the same horsepower may be utilized to operate the twister apparatus at a higher speed to increase the output. The seamless feature improves the belt tracking and reduces undesirable vibrations.

It is to be noted that while particular emphasis has been placed on the use of a glass fiber and the high tensile strength thereof that it is within the purview of this invention to use any continuous fiber that may be suitable for use in the fabrication of an endless and seamless belt as described herein. This confines the field, however, to synthetic fibers since natural fibers do not have sufficient continuous lengths to allow the formation of an endless and seamless belt of any practical size. Synthetic fibers such as nylon, Dacron, etc. fibers are practical for use in certain application even though their tensile strength is not the same as a glass fiber. Thus a continuous lineal textile body describes a synthetic fiber per its use herein.

It is apparent that, within the scope of this invention modifications and different arrangements may be made other than as herein disclosed, and the present disclosure is illustrative merely, the invention comprehending all variations thereof.

I claim:
1. Apparatus for driving a strand or yarn collector or the like comprising means for supporting said collector for rotation, and endless and seamless belt means mounted for driving engagement with said rotatable support means, said belt means including a plurality of wraps of a longitudinally extending lineal textile body of glass fiber set in a coating composition.

2. Apparatus for winding filamentary material on a collector comprising in combination a support, means journally mounted for rotation of the support and adapted to mount a tubular collector, and power transmitting means for driving said journally mounted means including an endless and seamless belt means, said belt means consisting of a plurality of wraps of a longitudinally extending lineal textile body of glass fiber set in a coating composition, and means for selectively engaging said journally mounted means with said belt means.

3. Twister apparatus for processing filamentary materials comprising at least one spindle mounting unit, a bolster rail for supporting said spindle mounting unit, a tubular spindle having a whorl formed at the lower end thereof arranged to be engaged by a driving belt for rotating said spindle, and endless and seamless driving belt consisting of a plurality of wraps of a longitudinally extending lineal textile body of glass fiber set in a coating composition, and means for supplying power to said belt.

4. Twister apparatus for processing filamentary materials comprising at least one spindle mounting unit, a bolster rail for supporting said spindle mounting unit, a tubular spindle having a whorl formed at the lower end thereof arranged to be engaged by a driving belt for rotating said spindle, an endless and seamless driving belt consisting of a plurality of wraps of a longitudinally extending lineal textile body of synthetic fiber set in a coating composition, and means for supplying power to said belt.

5. Twisting apparatus for processing fiber groupings into yarns comprising at least one spindle mounting unit, a bolster rail for supporting said spindle mounting unit, a plurality of rotatable spindles each having a whorl provided at one end aligned for engagement by a driving belt for rotating said spindles, and an endless seamless driving belt comprising a series of adjacent loops of a lineal textile body and an endless flexible matrix material incorporating said textile body loops as reinforcement, and means for supplying power to said belt.

References Cited
UNITED STATES PATENTS

| | | | |
|---|---|---|---|
| 1,799,896 | 4/1931 | Groveline | 57—105 |
| 1,804,091 | 5/1931 | Durand | 57—105 X |
| 1,860,955 | 5/1932 | Rowe | 57—105 |
| 1,866,322 | 7/1932 | Rowe | 57—105 |
| 1,983,038 | 12/1934 | Lenk | 57—105 |
| 2,130,944 | 9/1938 | Bowen | 74—232 X |
| 2,176,839 | 10/1939 | Gordon | 57—105 |
| 2,526,324 | 10/1950 | Bloomfield | 74—232 |
| 2,984,594 | 5/1961 | Runton | 74—232 |
| 3,002,536 | 10/1961 | Lord et al. | 74—232 |
| 3,120,731 | 2/1964 | Holschlag et al. | 57—94 |

FRANK J. COHEN, *Primary Examiner.*

D. WATKINS, A. J. SIDOTI, *Assistant Examiners.*